United States Patent [19]

Gritti

[11] Patent Number: 4,648,982
[45] Date of Patent: Mar. 10, 1987

[54] STABILIZERS FOR SILICATES IN ANTIFREEZE COMPOSITIONS

[75] Inventor: Serjio Gritti, Geneva, Switzerland

[73] Assignee: BP Chemicals Limited, London, England

[21] Appl. No.: 779,782

[22] PCT Filed: Feb. 14, 1985

[86] PCT No.: PCT/GB85/00060
§ 371 Date: Sep. 18, 1985
§ 102(e) Date: Sep. 18, 1985

[87] PCT Pub. No.: WO85/03719
PCT Pub. Date: Aug. 29, 1985

[30] Foreign Application Priority Data

Feb. 17, 1984 [GB] United Kingdom ............... 8404208

[51] Int. Cl.$^4$ ............................................. C09K 5/00
[52] U.S. Cl. ................................. 252/75; 252/78.3; 528/10; 556/449
[58] Field of Search ............... 252/75, 78.3; 528/10; 556/449

[56] References Cited

U.S. PATENT DOCUMENTS

| 2,846,458 | 8/1958 | Haluska | 556/445 |
| 3,337,496 | 8/1967 | Pines et al. | 252/78.3 |
| 3,398,174 | 8/1968 | Barnes, Jr. | 556/445 |
| 3,600,418 | 8/1971 | Bailey et al. | 252/78.3 |
| 3,694,480 | 9/1972 | Omietanski | 252/78.3 |
| 3,723,491 | 3/1973 | Rossmy et al. | 528/10 |
| 3,887,601 | 6/1975 | Kanner et al. | 528/10 |
| 4,010,110 | 3/1977 | Cosentino et al. | 252/180 |
| 4,287,077 | 9/1981 | Wing | 252/75 |
| 4,352,742 | 10/1982 | Davis et al. | 252/75 |

FOREIGN PATENT DOCUMENTS 97583 1/1984 European Pat. Off. .

Primary Examiner—Robert A. Wax
Attorney, Agent, or Firm—Brooks Haidt Haffner & Delahunty

[57] ABSTRACT

Stabilizers for silicate corrosion inhibitors useful in polyalkylene glycol antifreeze compositions are provided comprising an organosiloxane containing a polyoxyalkylene end chain.

5 Claims, No Drawings

STABILIZERS FOR SILICATES IN ANTIFREEZE COMPOSITIONS

The present invention relates to stabilizers for silicates used in antifreeze compositions, and in particular, for antifreeze compositions based on alkylene glycols.

It is known that alkali metal silicates are effective corrosion inhibitors for metal alloys, e.g. aluminium alloys. It has therefore been desirable to use alkali metal silicates in antifreeze formulations. However, alkali metal silicates tend to form gels in the presence of alkylene glycols which are also normally present in antifreezes. Thus, it has been previously proposed to use a stabilizer to prevent the gelation of the alkali metal silicate in the antifreeze composition.

Several types of silicon compounds have hitherto been described as suitable stabilizers. For instance, U.S. Pat. Nos. 3,234,144 and 4,241,012 describe the use of amino-siloxanes as stabilizers; U.S. Pat. Nos. 3,312,622 and 4,241,011 discloses carboxy siloxanes as suitable stabilizers; and U.S. Pat. Nos. 3,337,496 and 4,210,548 recommend the use of hydroxyalkyl derivatives of siloxanes.

One of the major problems with the previously described stabilizers is that they do not have adequate solubility in the alkylene glycol and/or water which form the basis of the antifreeze composition.

Moreover, the low solubility of conventional stabilizers makes it particularly difficult to produce the corrosive inhibitors in concentrated form. Such concentrates, containing large amounts of inhibitors in alkylene glycol (e.g. near the solubility limits), are generally not stable from gelation over storage period of several months. Thus, it would be highly desirable to develop stabilizers which would allow the production of inhibitor concentrates which could be stored for long periods and then blended as desired into antifreeze compositions.

It has now been found that the solubility problems encountered with prior art stabilisers can be mitigated by using polyoxyalkylene derivatives of siloxanes. Moreover, by incorporating a polyalkylene oxide into the siloxane molecule, the stabilisers have improved effectiveness for retarding gelation in concentration inhibitor compositions.

Accordingly, the present invention provides a stabiliser for silicate corrosion inhibitors useful in polyalkylene glycol compositions comprising an organosiloxane containing a polyoxyalkylene end chain of the general formula:

$$HO(C_nH_{2n}O)_x- \quad (I)$$

wherein
x is a number from 5 to 10 and
n is a number from 2 to 4.

Also provided in a separate embodiment is a organosiloxane compound of the general formula:

$$HO(C_nH_{2n}O)_xCH_2CH(OH)CH_2O(CH_2)_3SiO_{1.5} \quad (II)$$

wherein x and n are as defined in formula I.

In still another embodiment, the present invention provides an antifreeze composition comprising an alkylene glycol, a silicate corrosion inhibitor and the stabiliser of formula II.

The polyoxyalkylene end chain is as illustrated in formula I where n is a number from 2 to 4, preferably 2 and x is a number from 5 to 10, preferably 6 to 9 when n is 2. Most preferred are stabilisers of formula I wherein n is 2 and x is from 6 to 9.

The stabiliser of this invention is generally prepared by reaction of appropriate polyalkylene glycol with a gamma glycidyl oxyalkyl trialkoxysilane at elevated temperatures and atmospheric pressures.

In a preferred technique, the stabiliser is prepared by reacting glycidyl oxypropyl trimethoxysilane (GOTS) with a molar excess of the appropriate polyoxyalkylene glycol, for example 1 mole of GOTS with 5.3 moles of polyethylene glycol (in excess of stoichiometric amount to avoid polymer formation). The reaction is suitably carried out in a liquid medium and in an inert atmosphere. The reaction is conducted at a temperature from 80° C. to 200°, preferably from 100° C. to 150° C. and at atmospheric pressure in the presence of a hydroxide catalyst (preferably sodium or potassium hydroxide). The polyoxyalkylene derivative of GOTS so formed can be used as such, without any further treatment. GOTS is commerically available from Dynamit Nobel and Union Carbide.

The amount of the inventive stabiliser used in an antifreeze composition will depend upon the anti-corrosive formulation and in particular the amount of corrosion inhibitor but is suitably in the range from 0.05% to 3% by weight based on the total antifreeze composition.

Preferably, the alkylene glycol is propylene glycol, ethylene glycol or a mixture thereof.

The siloxanes of this invention and the effectiveness of the compositions produced therefrom are illustrated with reference to the following Example and Comparative Tests.

However, the Examples should not be construed as limiting the scope of this invention which includes equivalent embodiments, modifications and variations falling within the scope of the attached claims.

EXAMPLES AND COMPARATIVE TESTS

An antifreeze concentrate was prepared by dissolving the following inhibitors (w/w %)) in ethylene glycol.
Borax: 5.3
Sodium hydroxide: 0.5
Sodium benzoate: 10.0
Tolyltriazole: 0.3
Aqueous solution of potassium trisolicate (5.332% w/w): 10.0

The concentrate so formed was divided into 100 g aliquots.

EXAMPLE

To a 100 g aliquot of the concentrate was added 0.00144 moles of a commerically available modified siloxane of the formula:

$$HO(CH_2CH_2O)_{8.7}CH_2CHOHCH_2O(CH_2)_3SiO_{1.5}$$

The thus prepared mixture was subjected to an accelerated storage test by storing at 66° C. storage for 1 day at this temperature being approximately equivalent to storage for 1 month at 25° C.

The mixture remained a bright and clear liquid after 6 days with no gelation showing that the silicate had been stabilized.

Comparative Test 1

A 100 g control portion of the concentrate with no stabilizer was stored under the same conditions as in the Example above. This formulation gelled after storage for 1 day, showing the silicate to be relatively unstable.

Comparative Test 2

To a 100 g portion of the concentrate was added 0.00144 moles of a modified silioxane of the formula $CH_2OHCHCHCH_2O(CH_2)_3SiO_{1.5}$. This formulation was also stored under the same conditions as the Example above and the formulation gelled after 2 days.

I claim:

1. An organosiloxane compound of the general formula $$HO(C_nH_{2n}O)_xCH_2CH(OH)CH_2O(CH_2)_3SiO_{1.5} \qquad (II)$$

wherein
 x is a number from 5 to 10 and
 n is a number from 2 to 4.

2. The organosiloxane compound of claim 1 wherein x is 6 to 9 and n is 2.

3. An antifreeze composition comprising an alkylene glycol, a silicate inhibitor and a stabiliser of the general formula:

$$HO(C_nH_{2n}O)_xCH_2CH(OH)CH_2O(CH_2)_3SiO_{1.5} \qquad (II)$$

4. The antifreeze composition of claim 3 wherein in the stabiliser of formula (II) x is 6 to 9 and n is 2.

5. The antifreeze composition of claim 3 wherein the alkylene glycol is propylene glycol, ethylene glycol or mixtures thereof.